(12) United States Patent
Johnson et al.

(10) Patent No.: US 8,353,346 B2
(45) Date of Patent: Jan. 15, 2013

(54) PREVENTION, ACTUATION AND CONTROL OF DEPLOYMENT OF MEMORY-SHAPE POLYMER FOAM-BASED EXPANDABLES

(75) Inventors: Michael Johnson, Katy, TX (US); Oleg A. Mazyar, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 82 days.

(21) Appl. No.: 12/763,363

(22) Filed: Apr. 20, 2010

(65) Prior Publication Data

US 2011/0252781 A1      Oct. 20, 2011

(51) Int. Cl.
*E21B 43/27*     (2006.01)
(52) U.S. Cl. .................................................. 166/300
(58) Field of Classification Search ................ None
See application file for complete search history.

(56) References Cited

U.S. PATENT DOCUMENTS

| | | | |
|---|---|---|---|
| 4,137,970 A | | 2/1979 | Laflin et al. |
| 6,059,034 A * | | 5/2000 | Rickards et al. ........... 166/280.2 |
| 6,896,063 B2 | | 5/2005 | Chang et al. |
| 7,318,481 B2 | | 1/2008 | Richard |
| 2008/0087431 A1* | | 4/2008 | Willauer et al. ............. 166/290 |
| 2008/0196900 A1* | | 8/2008 | Leibfried et al. ............ 166/380 |
| 2008/0296023 A1* | | 12/2008 | Willauer ....................... 166/302 |
| 2009/0000793 A1 | | 1/2009 | Guillot et al. |
| 2009/0101354 A1 | | 4/2009 | Holmes et al. |
| 2010/0089565 A1* | | 4/2010 | Duan et al. ....................... 166/51 |

OTHER PUBLICATIONS

W. M. Huang, et al., "Water-Driven Programmable Polyurethane Shape Memory Polymer: Demonstration and Mechanism," Applied Physics Letters, 2005, vol. 86, 114105.
J. Leng, et al., "Comment on Water-Driven Programmable Polyurethane Shape Memory Polymer: Demonstration and Mechanism," Applied Physics Letters, 2008, vol. 92, 206105.

* cited by examiner

*Primary Examiner* — Angela M Ditrani
*Assistant Examiner* — Silvana Runyan
(74) *Attorney, Agent, or Firm* — Mossman Kumar & Tyler PC (57) ABSTRACT

Actuation and control of the deployment of a polymeric memory-shape material on a wellbore device on a downhole tool may be accomplished by treating a compacted or compressed polymeric memory-shape material with a deployment fluid to lower its $T_g$ and/or decrease its rigidity, thereby softening the polymeric shape-memory material at a given temperature and triggering its expansion or recovery at a lower temperature. Alternatively, the deployment of the compacted or compressed polymeric memory-shape material may be prevented or inhibited by shielding the material with an environment of a fluid that does not substantially lower its $T_g$, decrease its rigidity or both, and then subsequently contacting the material with a deployment fluid.

17 Claims, 9 Drawing Sheets

Finished Molded Part          Reshaped          Shape Recovery

PREVENTION, ACTUATION AND CONTROL OF DEPLOYMENT OF MEMORY-SHAPE POLYMER FOAM-BASED EXPANDABLES

TECHNICAL FIELD

The present invention relates to devices used in oil and gas wellbores employing shape-memory materials that remain in an altered geometric state during run-in; once the devices are in place downhole and are exposed to a given temperature at a given amount of time, the devices attempt to return to their original geometric position prior to alteration. More particularly, the present invention relates to such devices where the $T_g$ and/or its rigidity decrease by using a deployment fluid.

TECHNICAL BACKGROUND

Various methods of filtration, wellbore isolation, production control, wellbore lifecycle management, and wellbore construction are known in the art. The use of shaped memory materials in these applications have been disclosed for oil and gas exploitation. Shape Memory Materials are smart materials that have the ability to return from a deformed or compressed state (temporary shape) to their original (permanent) shape induced by an external stimulus or trigger (e.g. temperature change). In addition to temperature change, the shape memory effect of these materials may also be triggered by an electric or magnetic field, light, contact with a particular fluid or a change in pH. Shape-memory polymers (SMPs) cover a wide property range from stable to biodegradable, from soft to hard, and from elastic to rigid, depending on the structural units that constitute the SMP. SMPs include thermoplastic and thermoset (covalently cross-linked) polymeric materials. SMPs are known to be able to store multiple shapes in memory.

Dynamic Mechanical Analysis (DMA), also called dynamic mechanical thermal analysis (DMTA) or dynamic thermomechanical analysis is a technique used to study and characterize SMP materials. It is most useful for observing the viscoelastic nature of these polymers. The sample deforms under a load. From this, the stiffness of the sample may be determined, and the sample modulus may be calculated. By measuring the time lag in the displacement compared to the applied force it is possible to determine the damping properties of the material. The time lag is reported as a phase lag, which is an angle. The damping is called tan delta, as it is reported as the tangent of the phase lag.

Viscoelastic materials such as shape-memory polymers typically exist in two distinct states. They exhibit the properties of a glass (high modulus) and those of a rubber (low modulus). By scanning the temperature during a DMA experiment this change of state, the transition from the glass state to the rubber state, may be characterized. It should be noted again that shaped memory may be altered by an external stimulus other than temperature change.

Figure 1:
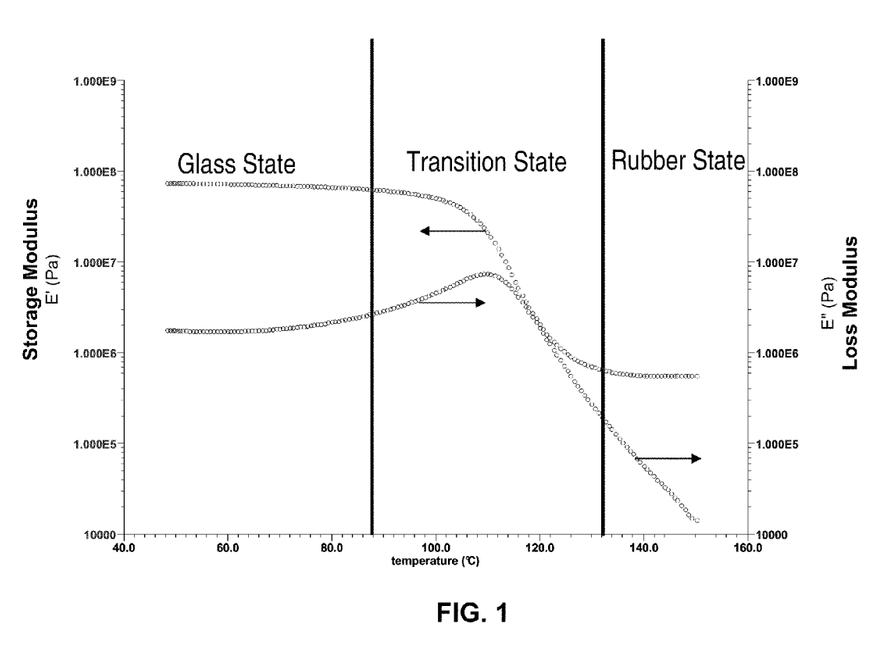
FIG. 1 is a graph of storage modulus E' (elastic response) (left vertical axis) and modulus E" (viscous response) (right vertical axis) as a function of temperature for a shape memory polymers illustrating the change in each modulus as the polymer is heated from the Glass State through the Transition State to the Rubber State.

The storage modulus E' (elastic response) and loss modulus E" (viscous response) of a polymer as a function of temperature are shown in FIG. 1. The nature of the transition state of the shaped memory polymer affects material's shape recovery behavior and can be descriptive of the polymer's shape recovery. Referring to FIG. 1, the Glass State is depicted as a change in storage modulus in response to change in temperature which yields a line of constant slope. The Transition State begins when a slope change occurs in the storage modulus as the temperature is increased. This is referred to as the $T_g$ Onset which in FIG. 1 is approximately 90° C. The $T_g$ Onset is also the point where shape recovery can begin. $T_g$ for a shape-memory polymer described by FIG. 1 is defined as the peak of the loss modulus, which in FIG. 1 is approximately 110° C. If the slope's change of the storage modulus were represented by a vertical line of undefined slope, the material shape recovery would occur at a specific temperature and transition immediately from the glassy state to the rubber state. Generally, the more gradual the slope change of the storage modulus in the transition state, the greater the range of temperatures which exhibit characteristics of both the glass and rubber states. The transition state is the area of interest for the SMP material's shape recovery characteristics. It should also be evident that shape recovery would occur more slowly if stimulus temperature is closer to the $T_g$ Onset temperature and that shape recovery would be more rapid as the stimulus temperature approached or exceeded the $T_g$.

Figure 2:
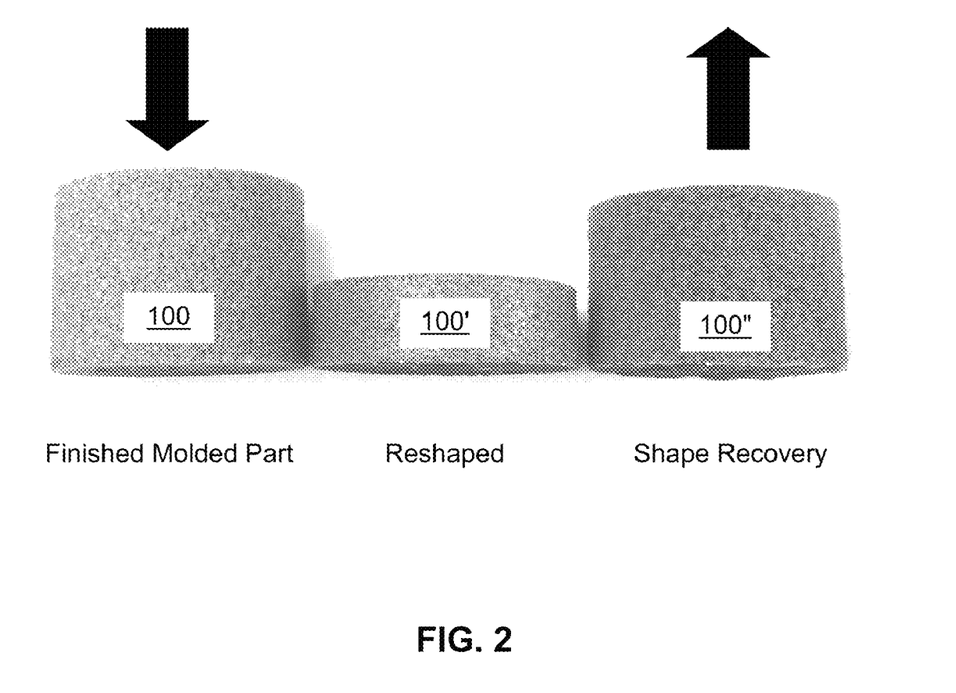
FIG. 2 is a photograph of a finished shape-memory polymer part before it is heated close to the $T_g$ of the polymer and force is applied to reshape it to a different configuration or shape and then cooled below the polymer's onset $T_g$, and finally when the part is heated to the onset $T_g$ at which point recovery will begin and the part returns to at or near its original shape.

One method of making use of the unique behavior of shape-memory polymers is via temperature response described above. An example is seen in FIG. 2. The finished molded part 100 of shape-memory polymer has a defined $T_g$ and $T_g$ Onset. This may be considered an original geometric position of the shape-memory material. The part is then heated close to the $T_g$ of the polymer. Force is applied to the finished part to reshape the part into a different configuration or shape 100'. This may be considered an altered geometric position of the shape-memory material. The reshaped part 100' is then cooled below the shape-memory polymer's $T_g$ Onset and the force removed. The finished part 100' will now retain the new shape until the temperature of the part is raised to the $T_g$ Onset at which point shape recovery will begin and the part will attempt to return to its original shape 100 or if constrained, the part will conform to the new constrained shape 100". This shape 100" may be considered the shape-memory material's recovered geometric position.

U.S. Pat. No. 7,318,481 assigned to Baker Hughes Incorporated disclosed a self-conforming expandable screen which comprises a thermosetting open cell shape-memory polymeric foam. The foam material composition is formulated to achieve the desired transition temperature slightly below the anticipated downhole temperature at the depth at which the assembly will be used. This causes the conforming foam to expand at the temperature found at the desired depth.

Flawless installation and deployment of memory-shape polymer foam-based conformable sand screens, packing elements and other downhole tools are two crucial steps that determine the overall success of the expandable tool's operation. These steps may be challenging to execute. Therefore, effective prevention of the deployment during the installation, flawless triggering of the deployment of the expandable elements at the appropriate time, and reliable control of the rate and the extent of the deployment are essential for the expandable elements' successful performance would be very desirable and important. It would be very helpful to discover a method and device for precisely installing and deploying an element made of shaped memory material at a particular location downhole to achieve some desired function of filtration, wellbore isolation, production control, wellbore lifecycle management, and wellbore construction. Generally, the more control and versatility for deploying an element the better, as this gives more flexibility in device designs and provides the operator more flexibility in designing, placement and configuration of the wellbore devices.

SUMMARY

There is provided, in one non-limiting form, a wellbore device that includes at least one polymeric shape-memory material having an original glass transition temperature ($T_g$) and an original rigidity. The wellbore device also includes a deployment fluid contacting the polymeric shape-memory material in an amount effective to have an effect selected from the group consisting of lowering the $T_g$ and/or decreasing the rigidity.

There is additionally provided in another non-restrictive version a wellbore device that includes a substrate e.g. a billet and at least one polymeric shape-memory material on the substrate. The polymeric shape-memory material has an original glass transition temperature ($T_g$) and an original rigidity. The polymeric shape-memory material may be a polyurethane, a polyurethane made by reacting a polycarbonate polyol with a polyisocyanate, a polyamide, a polyurea, a polyvinyl alcohol, a vinyl alcohol-vinyl ester copolymer, a phenolic polymer, a polybenzimidazole, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, and combinations thereof. The wellbore device may additionally include a deployment fluid contacting the polymeric shape-memory material in an amount effective to have an effect of lowering the $T_g$ to a second and lower $T_g$ and/or decreasing the original rigidity to a second, decreased rigidity. The wellbore device has the property that when substantially all of the deployment fluid is removed from the polymeric shape-memory material, an effect is obtained that may include restoring the $T_g$ to within at least about 90% of the original $T_g$ and/or restoring the rigidity within at least about 25% of the original rigidity.

In another non-limiting embodiment there is provided a method of installing a wellbore device on a downhole tool in a wellbore. The method involves introducing the downhole tool bearing the wellbore device into a wellbore. Again, the wellbore device includes at least one polymeric shape-memory material having an original $T_g$ and an original rigidity. The polymeric shape-memory material is in an altered geometric position and the polymeric shape-memory material is contacted by a first fluid. The first fluid is substantially removed. The method further involves contacting the polymeric shape-memory material with a deployment fluid in an amount effective to have an effect selected from the group consisting of lowering the $T_g$ and/or decreasing the rigidity. The method additionally involves recovering the polymeric shape-memory material from its altered geometric position for run-in downhole to a recovered geometric position.

DETAILED DESCRIPTION

It has been discovered that the actuation and control of the deployment of the memory-shape polymer foam-based expandables can be accomplished by treating the compacted expandables with deployment fluids reducing the glass transition temperature of the polymer, $T_g$, softening the polymer material at a given temperature and, therefore, triggering its expansion. Alternatively, the deployment of the compacted expandables at a given temperature may be prevented by shielding the expandables with a screen or shield of the fluids from the naturally occurring wellbore deployment fluids.

Wellbore devices, such as those used in filtration, wellbore isolation, production control, lifecycle management, wellbore construction and the like may be improved by including the shape-memory materials that are run into the wellbore in altered geometric positions or shapes where the shape-memory materials change to their respective original or recovered geometric positions or shapes at different $T_g$ Onsets and/or different slope changes (the slope change in the respective transition state from a glass state to a rubber state).

The shape-memory material is made in one non-limiting embodiment from one or more polyol, such as, but not limited to, a polycarbonate polyol and at least one isocyanate, including, but not necessarily limited to, a modified diphenylmethane diisocyanate (MDI), as well as other additives including, but not necessarily limited to, blowing agents, molecular cross linkers, chain extenders, surfactants, colorants and catalysts.

The shape-memory polyurethane materials are capable of being geometrically altered, in one non-limiting embodiment compressed substantially, e.g., 20~30% of their original volume, at temperatures above their onset glass transition temperatures ($T_g$) at which the material becomes soft. While still being geometrically altered, the material may be cooled down well below its Onset $T_g$, or cooled down to room or ambient temperature, and it is able to remain in the altered geometric state even after the applied shape altering force is removed.

When the material is heated near or above its Onset $T_g$, it is capable of recovery to its original geometric state or shape, or close to its original geometric position; a state or shape which may be called a recovered geometric position. In other words, the shape-memory material possesses hibernated shape-memory that provides a shape to which the shape-memory material naturally takes after its manufacturing. The compositions of polyurethanes and other polymeric shape-memory materials are able to be formulated to achieve desired onset glass transition temperatures which are suitable for the downhole applications, where deployment can be controlled for temperatures below Onset $T_g$ of devices at the depth at which the assembly will be used.

Generally, polyurethane polymer or polyurethane foam is considered poor in thermal stability and hydrolysis resistance, especially when it is made from polyether or polyester. It has been previously discovered that the thermal stability and hydrolysis resistance are significantly improved when the polyurethane is made from polycarbonate polyols and methylene diphenyl diisocyanate (MDI) as noted above. The compositions of polyurethane foam herein are able to be formulated to achieve different glass transition temperatures within the range from 60° C. to 170° C., which is especially suitable to meet most downhole application temperature requirements. More details about these particular polyurethane foams or polyurethane elastomers may be found in U.S. Patent Application Publication No. 2010/0089565 A1, incorporated herein by reference in its entirety.

Notwithstanding the above, the wellbore devices described herein and methods of using them may be practiced with a wide variety of polymeric shape-memory materials including, but not necessarily limited to, polyurethanes, polyurethanes made by reacting a polycarbonate polyol with a polyisocyanate, polyamides, polyureas, polyvinyl alcohols, vinyl alcohol-vinyl ester copolymers, phenolic polymers, polybenzimidazole, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, and combinations thereof. While it is expected that in most implementations the polymeric shape-memory material will be a cellular foam, it is also to be understood that other physical structures which are not cellular foams, for instance an elastomer, may find use as the polymeric shape-memory material. Of course, elastomers may also be cellular in some non-limiting embodiments.

Suitable deployment fluids include, but are not necessarily limited to water, brines, dimethyl sulfoxide, ketones, alcohols, glycols, ethers, hydrocarbons, and mixtures thereof. Specific examples of suitable polar fluids include, but are not necessarily limited to, water, brines, methanol, ethanol, isopropyl alcohol, ethylene glycol monobutyl ether (EGMBE), dimethyl sulfoxide, and acetone. Specific examples of suitable non-polar fluids include, but are not necessarily limited to, vegetable oils, mineral oil, LVT 200 oil, and crude oil. LVT 200 oil is described as hydrotreated distillate of light C9-16 containing cycloparaffinic, isoparaffinic, and normal paraffinic hydrocarbons available from Delta Drilling Products & Services, LLC. Generally, the more polar a fluid is, the more likely the fluid will serve as a deployment fluid, although nearly all fluids may exhibit some benefit as a deployment fluid, depending on the polymeric shape-memory material being treated. It should be understood that the particular deployment fluid should not be a solvent for the polymeric shape-memory material. That is, that the polymeric shape-memory material should not be soluble in the deployment fluid to any appreciable extent.

The amount effective to affect the $T_g$ and/or the rigidity is a quantity necessary to essentially saturate or soak all of the polymeric shape-memory material that is desired to be affected. Since it is expected that in most embodiments the polymeric shape-memory material will be an open cell foam, it may not be physically possible for the deployment fluid to infiltrate all of the cells, but at least 25 vol %, alternatively at least 50 vol %, and even at least 90 vol % of the material may be contacted. In the event that the polymeric shape-memory material is not a foam, or is instead a material such as an elastomer which is non-cellular, it may be more difficult for the deployment fluid to reach all of the polymer chains in the material. In non-limiting embodiments, more time may be needed for the deployment fluid to be more effective or the deployment fluid may need to be altered, for instance a fluid having relatively smaller molecules to permit the polymer chain structure to be infiltrated.

Figure 3:
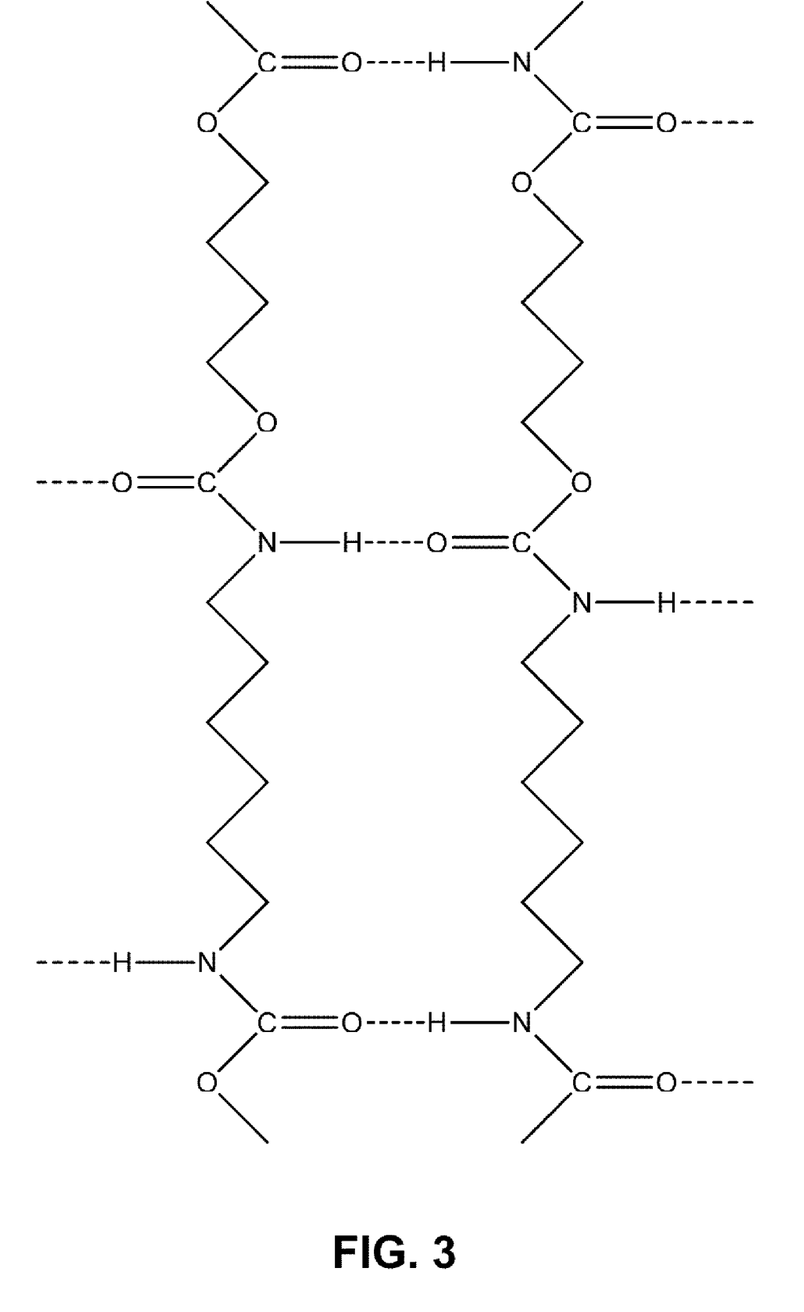
FIG. 3 is a schematic illustration of polyurethane chains coupled via hydrogen bonding, illustrating the crystal structure of polyurethane where the mobility of polymer chains is limited, therefore the material has higher $T_g$.
Figure 4:
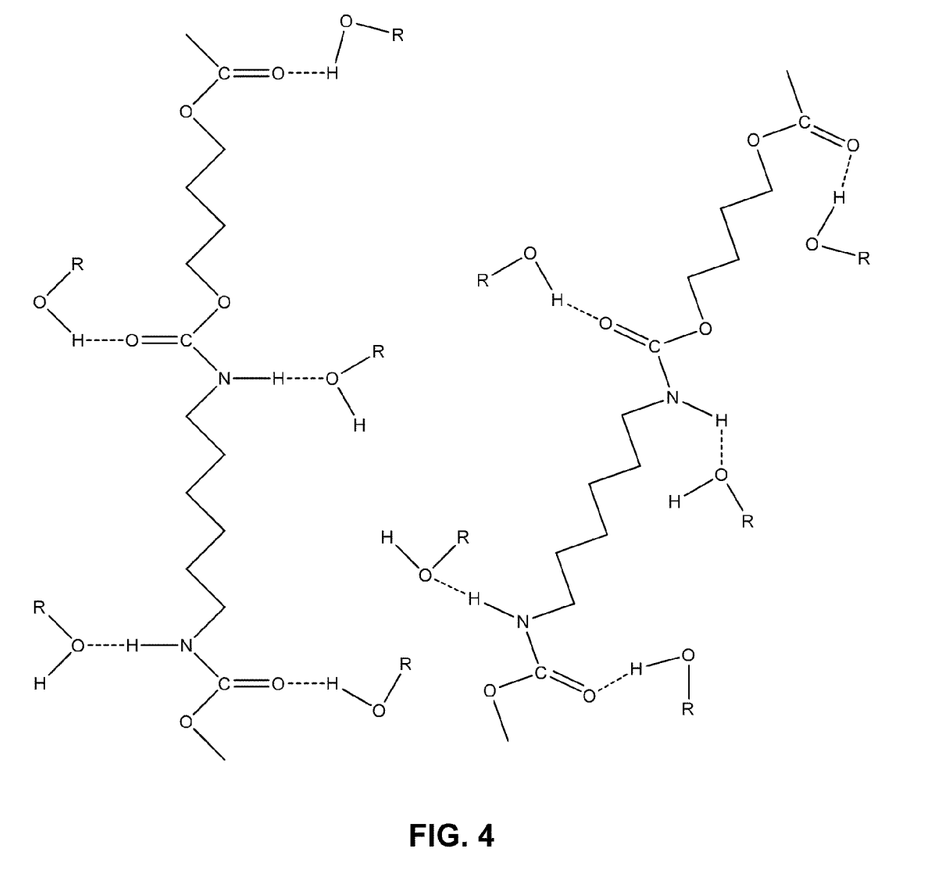
FIG. 4 is a schematic illustration of the hydrogen bonding network between polyurethane chains being disrupted by an alcohol deployment fluid ROH, showing that the polymer chains are decoupled and relatively more mobile; therefore, $T_g$ of the material is lower and its rigidity is reduced.

One non-limiting theory about how the method and devices described herein may operate may be seen with reference to FIGS. 3 and 4. As shown in FIG. 3, polyurethane chains coupled via hydrogen bonding represent the crystal structure of polyurethane and because the polyurethane chains are more ordered and regular, the polymer chains are relatively parallel, the crystalline polyurethane is more rigid. The mobility of polymer chains is limited, therefore the material has higher $T_g$. However, if another substance is introduced, for instance an alcohol ROH serving as a deployment fluid, the hydrogen bonding network between polyurethane chains is disrupted. The polymer chains are decoupled from one another and relatively more mobile, therefore, the $T_g$ of the material is lower and the rigidity of the material is reduced, for instance to a second, lower $T_g$ and a second, decreased rigidity, respectively.

It has been discovered that water alone cannot decrease the $T_g$ of the polycarbonate-polyurethane material significantly enough to deploy a wellbore device at 115° F. (46.1° C.), for example. On the other hand, it has been found that a EGMBE/MeOH/KCl brine deployment fluid can deploy a wellbore device at this temperature. A non-limiting explanation is that a single water molecule has a negatively charged oxygen and two positively charged hydrogen atoms. Therefore it can make two H-bonds simultaneously: in a first scenario of one with the oxygen atom of carboxyl group of one polymer chain, the other with an oxygen atom of a carboxyl group of a second polymer chain. However, it may also have a second scenario of a hydrogen bond to one carboxyl oxygen on a first polymer chain and a second hydrogen bond to a hydrogen atom on a urethane link of a second polymer chain. Thus chains 1 and chain 2 are not very effectively decoupled since they are coupled via a single water molecule. Note however that water molecules can also form H-bonded chains between themselves. Therefore, there may be coupling such as: Chain 1-water-. . . -water-Chain 2. This coupling via chains of water molecules would not be expected to be strong.

Alternatively, ROH alcohols cannot form H-bonds with two chains simultaneously via the first scenario described above, but may do so via the second scenario. In another non-limiting embodiment, such coupling may occur through a glycol or through a bridge such as: Chain 1-ROH— . . . —ROH-Chain 2, but would not be expected to be a strong coupling. However, the alkyl portions of alcohol molecules may serve as the spacers between the polymer chains and decouple the chains more effectively than water alone. Therefore, the polymer's $T_g$ in alcohols or more complex (multicomponent) deployment fluids may be lower than that achieved in only water.

In a polyurethane-polycarbonate polymer, in one non-restrictive version herein, there are many carboxyl oxygen atoms on the chain and fewer hydrogen atoms of the urethane linkages. Thus, water molecules may make many Chain 1-water-Chain 2 bridges, while alcohols ROH may make fewer Chain 1-ROH-Chain 2 bridges since there are relatively fewer hydrogen atoms of polyurethane linkages on the chain compared to carboxyl oxygen atoms.

Deployment fluids which cannot disrupt the hydrogen bonding of the polymer chains by engaging in hydrogen bonding themselves may still affect the $T_g$ and rigidity of the polymer chains by simply physically interfering or coming between the hydrogen bonding sites of the adjacent polymer chains to prevent or inhibit the chains from hydrogen bonding with each other. This non-limiting understanding may help explain why non-polar materials such as hydrocarbons, e.g. oils, can still lower $T_g$ and reduce rigidity of the polymer materials. It may thus be understood that there is roughly a spectrum of useful deployment fluids, where the more polar fluids have more of an effect and the less polar fluids have less of an effect.

It should also be realized that the effect of the deployment fluid is reversible. That is, when the deployment fluid is removed, the $T_g$ of the polymeric shape-memory material as well as the original rigidity are restored. As a practical matter, it is not possible to remove all of the deployment fluid from the polymeric shape-memory material once it has been contact thereby or even saturated therewith. Since the polymeric shape-memory material is porous, and in one beneficial embodiment is an open cell foam, it is simply physically difficult to remove all of the deployment fluid once it is contacted with and introduced into the foam. Thus, in one non-limiting embodiment "substantially removing all of the deployment fluid" is defined herein as removing at least 90 volume % of the fluid, alternatively at least about 95 vol %, and in another version at least 99 vol %. Of course, complete removal is a goal.

Thus, it may be understood that with substantially all of the deployment fluid is removed from the polymeric shape-memory material, the effects may be restoring the $T_g$ to within at least 90% of the original $T_g$ and/or restoring the rigidity within at least 25% of the original rigidity. Alternatively, the $T_g$ is restored to within at least 95% of the original $T_g$ and/or the rigidity is restored to within at least 50% of the original rigidity. In another non-restrictive version, the $T_g$ is restored to within at least 99% of the original $T_g$ and/or the rigidity is restored to within at least 90% of the original rigidity. Of course, complete restoration of these properties is desirable. Rigidity may be restored when, in a non-limiting example, the alcohol ROH is removed from the schematic structure shown in FIG. 4 and the hydrogen bonding between the polymer chains is restored, as schematically shown in FIG. 3.

In one non-limiting embodiment, an optional surfactant may be used to help recover a deployment fluid from the polymeric shape-memory material. Suitable surfactants when the deployment fluid being removed is a polar fluid such as water, brines, dimethyl sulfoxide, ketones, alcohols, glycols and ethers may include, but not necessarily limited to, anionic, cationic, amphoteric, and non-ionic surfactants. Suitable surfactants when the deployment fluid being removed is a non-polar fluid such as an oil, e.g. a plant oil, for instance, olive oil or sunflower oil, may include, but not necessarily limited to, anionic, cationic, amphoteric, and non-ionic surfactants The method described herein may have considerable benefit. In one non-limiting example, a single wellbore device product having only one type of polymeric shape-memory material may be used in a variety of applications requiring deployment of the polymeric shape-memory material from its altered geometric position to a recovered geometric position at different $T_g$s simply by contacting, soaking or saturating the polymeric shape-memory material in its altered geometric position in a suitable different deployment fluid designed to alter its $T_g$ in different amounts.

In one specific non-limiting embodiment, the shape-memory material is a polyurethane material that is extremely tough and strong and that is capable of being geometrically altered and returned to substantially its original geometric shape. The $T_g$ of the shape-memory polyurethane foam may range from about 40° C. to about 200° C. and it is geometrically altered by mechanical force at 40° C. to 190° C. While still in geometrically altered state, the material may be cooled down to room temperature or some other temperature below the $T_g$ of each shape-memory material. The shape-memory polyurethane is able to remain in the altered geometric state even after applied mechanical force is removed. However, as described herein, the polymeric shape-memory material in its altered geometric state may be contacted, saturated or soaked in a deployment fluid which alters its $T_g$, generally lowering it. When the compressed polymeric shape-memory material is heated to above its reduced or modified onset $T_g$, it is able to return to its original shape, or close to its original shape. The time required for geometric shape recovery can vary from about 20 minutes to 40 hours or longer depending on the slope of the transition curves as the material moves from a glass state to a rubber state. If the material remains below the altered or lowered onset $T_g$ it remains in the geometrically altered state and does not change its shape.

Ideally, when shape-memory polyurethane is used as a downhole device, it is preferred that the device remains in an altered geometric state during run-in until it reaches to the desired downhole location. Usually, down-hole tools traveling from surface to the desired downhole location take hours or days. Thus, it is important to match the altered onset $T_g$s of the material with the expected downhole temperatures. The deployment fluids described herein help the designer prevent premature deployment of the polymeric shape-memory material and control when and where deployment occurs, thus permitting flawless implementation and deployment of the wellbore device.

In some non-limiting embodiments, when the temperature is high enough during run-in, the devices made from the shape-memory polyurethane could start to recover. To avoid undesired early recovery during run-in, delaying methods may or must be taking into consideration. In previous non-limiting embodiments, a poly(vinyl alcohol) (PVA) film or other suitable film may be used to wrap or cover the outside surface of devices made from shape-memory polyurethane to prevent recovery during run-in. Once devices are in place downhole for a given amount of time at temperature, the PVA film is capable of being dissolved in the water, emulsions or other downhole fluids and, after such exposure, the shape-memory devices may recover to their original geometric shape or conform to the bore hole or other space. However, the apparatus and methods described herein instead prevent undesired early recovery of the polymeric shape-memory material by contacting, soaking or enveloping the material in a deployment fluid that alters the $T_g$ sufficiently to help inhibit or prevent premature deployment.

In one non-limiting embodiment, a downhole tool may have a wellbore device that is a polymeric shape-memory material as described herein which may be designed to permit fluids, but not fines or other solids to pass through, such as a screen. In a different non-restrictive version, the polymeric shape-memory material may be designed to prevent fluids as well as solids from passing therethrough, in which case the tool is a packer or other isolation device. In these and other such embodiments, the recovered geometric position of the polymeric shape-memory material may be to totally conform to the available space between the wellbore device and the borehole wall or casing. When it is described herein that a device "totally conforms" to the borehole, what is meant is that the shape-memory material recovers or deploys to fill the available space up to the borehole wall. The borehole wall will limit the final, recovered shape of the shape-memory material and in fact not permit it to expand to its original, geometric shape. In this way however, the recovered or deployed shape-memory material, will perform the desired function within the wellbore. In summary, suitable wellbore devices used on the apparatus or in the methods described herein include, but are not necessarily limited to an expansion took a screen, a packer, and an isolation plug.

The invention will now be described with respect to certain specific examples which are not intended to limit the invention in any way but simply to more fully illuminate it.

Example 1

Figure 5:
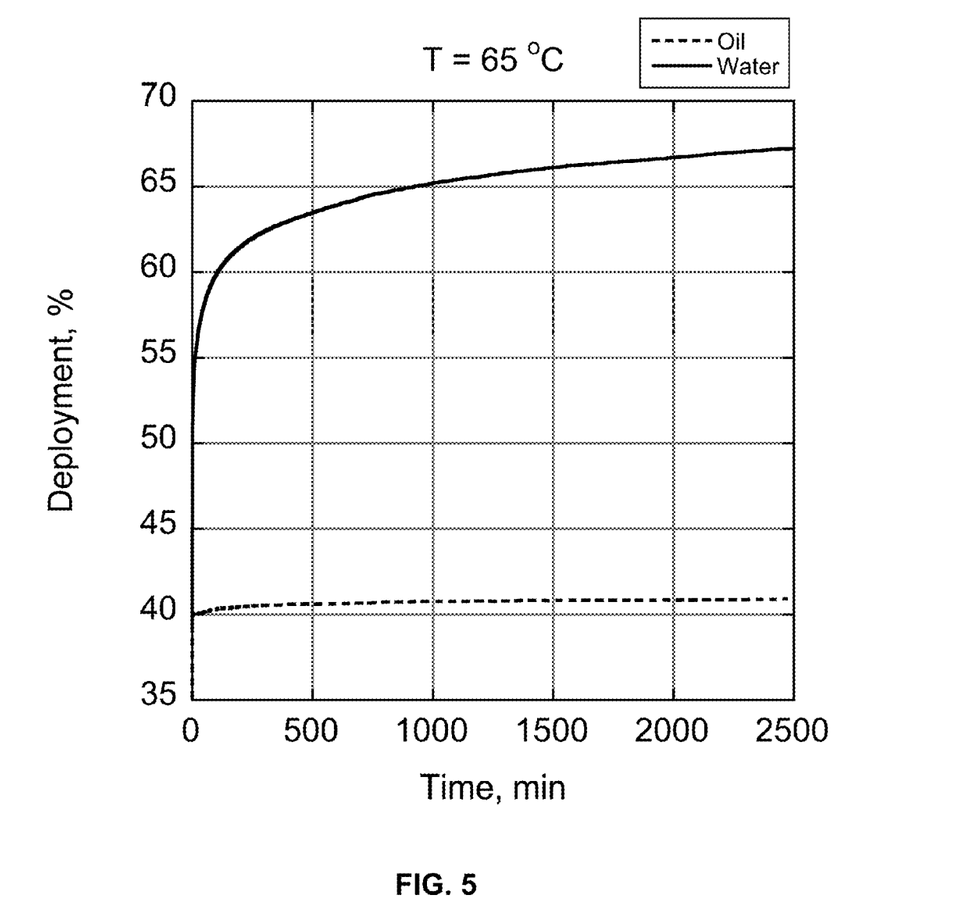
FIG. 5 is a chart of % deployment of compacted samples of the shape-memory polyurethane-polycarbonate rigid open-cell foam in vegetable oil and water as a function of time at 65° C.

The effect of polar and non-polar deployment fluids on the deployment of the memory-shape polymer foam-based expandables is shown in FIG. 5. Two cylindrical samples of polyurethane-polycarbonate rigid open-cell foam (h=4 mm, d=7 mm) were immersed into vegetable oil and water at 65° C. and compacted to 35.2% and 39.4% of their original height, respectively. After the compressive loads on samples were removed, the sample immersed in the vegetable oil expanded to 39.9% of its original height within 21 seconds and then further expanded to only 40.9% of its original height during the next 2468 minutes, while the sample immersed in water rapidly expanded to 50.8% of its original height within 62 seconds and then gradually expanded further to 67.2% of its original height during the next 2500 minutes. Note that the initial rapid expansion of the foam samples reflects an elastic response of the foam to the compressive load removal and can be avoided if the pre-compacted samples are immersed into the liquid to deploy. Therefore, the foam sample immersed in the vegetable oil was effectively "frozen" at 65° C., while the sample immersed in the water was able to continually expand with a decreasing rate as a function of time at the same temperature. Thus, this experiment shows that a compacted polyurethane/polycarbonate foam-based expandable element can be safely transported downhole and installed at the temperatures less than at least 65° C. if the wellbore is circulated with an oil-based liquid. Replacement of the oil-based circulating fluid with a water-based liquid would trigger the deployment of the expandables at the same temperature. This experiment also shows that the onset temperature for the deployment of a foam-based element immersed in the water is lower than 65° C.

Example 2

In this particular case of a polycarbonate-polyurethane memory-shape foam material, it is believed that the relatively light and mobile water molecules form hydrogen bonds with the negatively charged oxygen atoms of polycarbonate chains and the positively charged hydrogen atoms of urethane (carbamate) links inducing their motion and likely acting as an "internal lubricant" between the polymer chains, as previously discussed. A comprehensive molecular-level understanding of interactions of water molecules with polymer chains may be provided by the Molecular Dynamics simulations, described by Tamar Schlick in "Molecular Modeling and Simulation", Springer-Verlag, New York, 2002, incorporated herein by reference.

Figure 6:
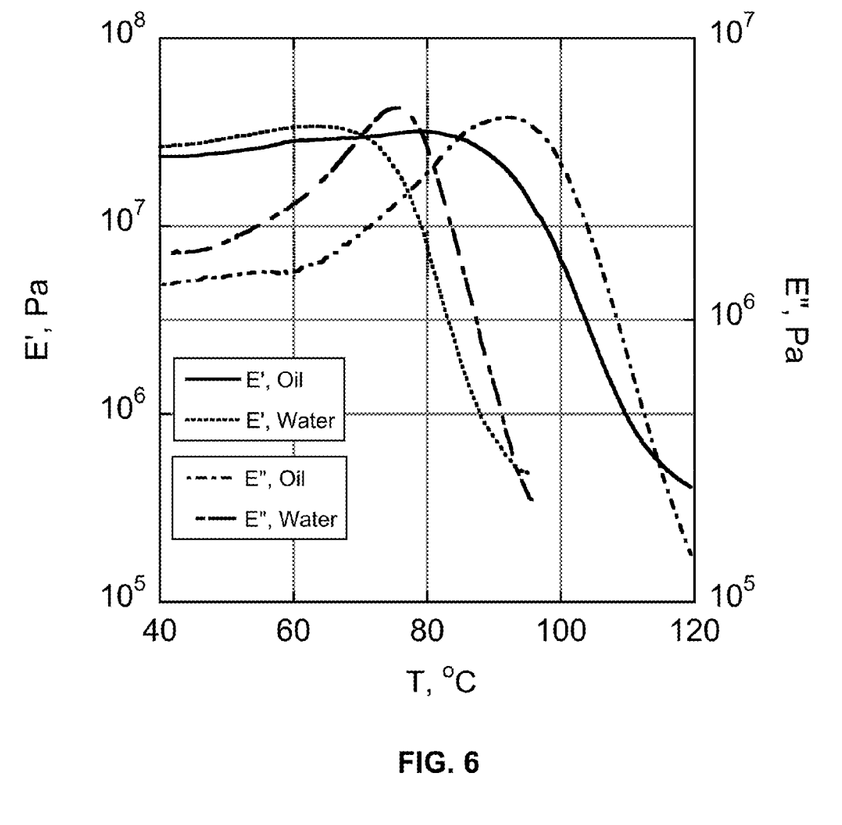
FIG. 6 is a graph of the storage (E') and loss (E") moduli of the foam samples immersed in vegetable oil and water as functions of the temperature; the glass transition temperature of the polymer immersed in liquid ($T_g$) corresponds to the peak value of the loss modulus E"

This phenomenon effectively reduces a glass transition temperature, $T_g$, of the polyurethane/polycarbonate foam immersed in the water in comparison with $T_g$ of the same material immersed in vegetable oil by a $\Delta T_g$ of about $-17°$ C., as seen in FIG. 6. FIG. 6 is a graph of the storage (E') and loss (E") moduli of the polymeric shape-memory material samples immersed in oil and water as functions of the temperature. The glass transition temperature of the polymer immersed in liquid ($T_g$) corresponds to the peak value of the loss modulus E" and indicates that the $T_g$ is about 17° C. lower when water is used as compared to when oil is used. Please also note the shift to the left of the storage modulus E' curve when water is used compared to when the oil is employed.

Hence, the water acts as a deploying or activating agent on the polymer foam while the vegetable oil does not display as significant $T_g$ reduction and "lubricating" (rigidity reduction) properties. Therefore, by replacing a non-polar (hydrocarbon) wellbore circulating fluid which does not have relatively large $T_g$-reducing properties with a relatively more $T_g$-reducing ability fluid contacting the polymer foam material, the onset temperature for the deployment of the memory-shape polymer foam-based expandables may be reduced. In one non-limiting implementation, the deployment onset temperature may be kept high during the transportation downhole and the installation procedures. Then the $T_g$ may be lowered by replacing the oil-based circulating fluids with the water-based ones to actuate the deployment of the expandables. It should be noted that the variety of possible deployment fluids is wide, and the water and the vegetable oil are used only as examples.

Example 3

Figure 7:
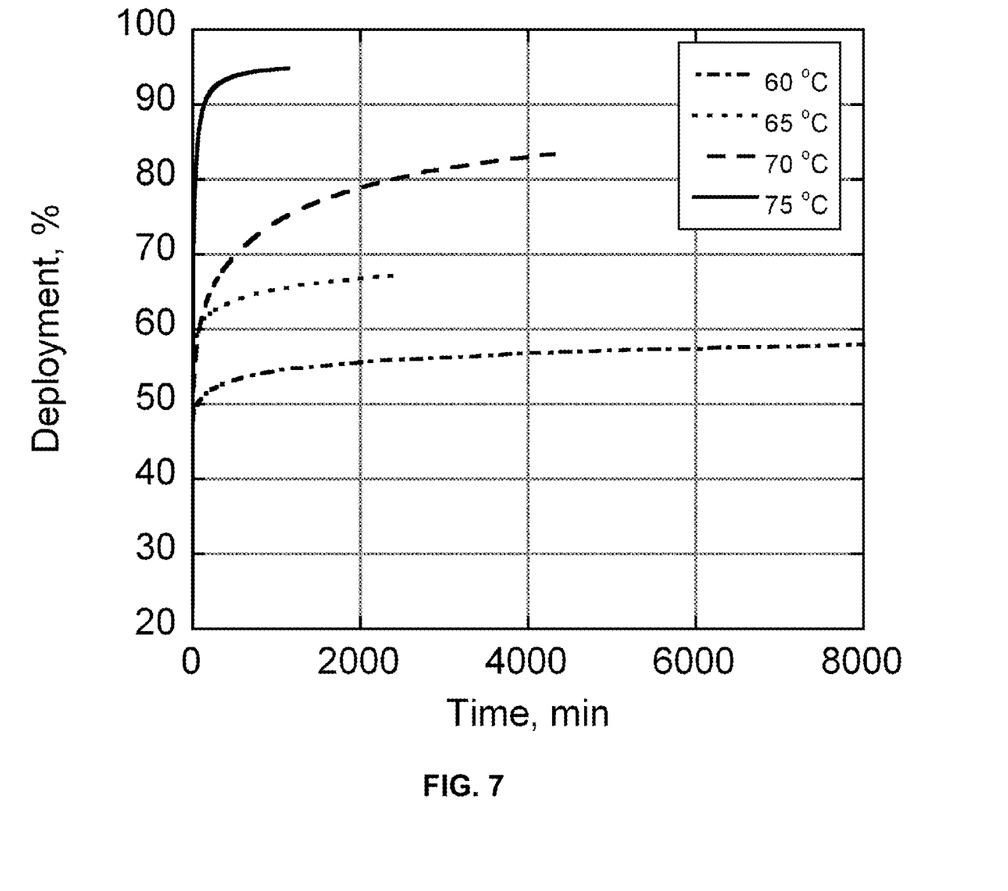
FIG. 7 is a graph of the deployment temperatures of compacted samples of a polymeric foam shape-memory material in water as a function of temperature.

As shown in FIG. 7, by changing the temperature of the circulating liquid, it is possible to control both the rate and the extent of the deployment of the memory-shape polymer foam-based expandables. As shown in FIG. 7, increasing the temperature increases the rate as well as the extent of the expandables' deployment. It should be noted that this effect holds for the foam immersed in both the more polar deployment fluids and the non-polar deployment fluids.

Example 4

The following data support the understanding that a polar deployment fluid which decreases $T_g$ of the material relatively more than a non-polar fluid is also more effective for reducing the deployment time of the totally conformable sand screen (TCS). In this Example the TCS was a polyurethane/polycarbonate foam.

The TCS material before contact with the activation fluid has a $T_g$ in 3% KCl solution of 71° C. After its immersion in activation fluids at 115° F. for 72 hours, the $T_g$s in 3% KCl solution are as shown in Table I.

TABLE I

T$_g$ of the Material in 3% KCl Solution after Deployment Using Various Blends of EGMBE and MeOH

| Deployment Fluid Composition | T$_g$, °C. |
|---|---|
| None (Tg of Material before Compaction and Deployment) | 71 |
| 4% volume Ethylene Glycol Monobutyl Ether (EGMBE) 25% volume CH$_3$OH and 8.9 ppg KCl | 44.1 |
| 5% volume EGMBE 25% volume CH$_3$OH and 8.9 ppg KCl | 38.9 |
| 6% volume EGMBE 25% volume CH$_3$OH and 8.9 ppg KCl | 32.6 |

Figure 8:
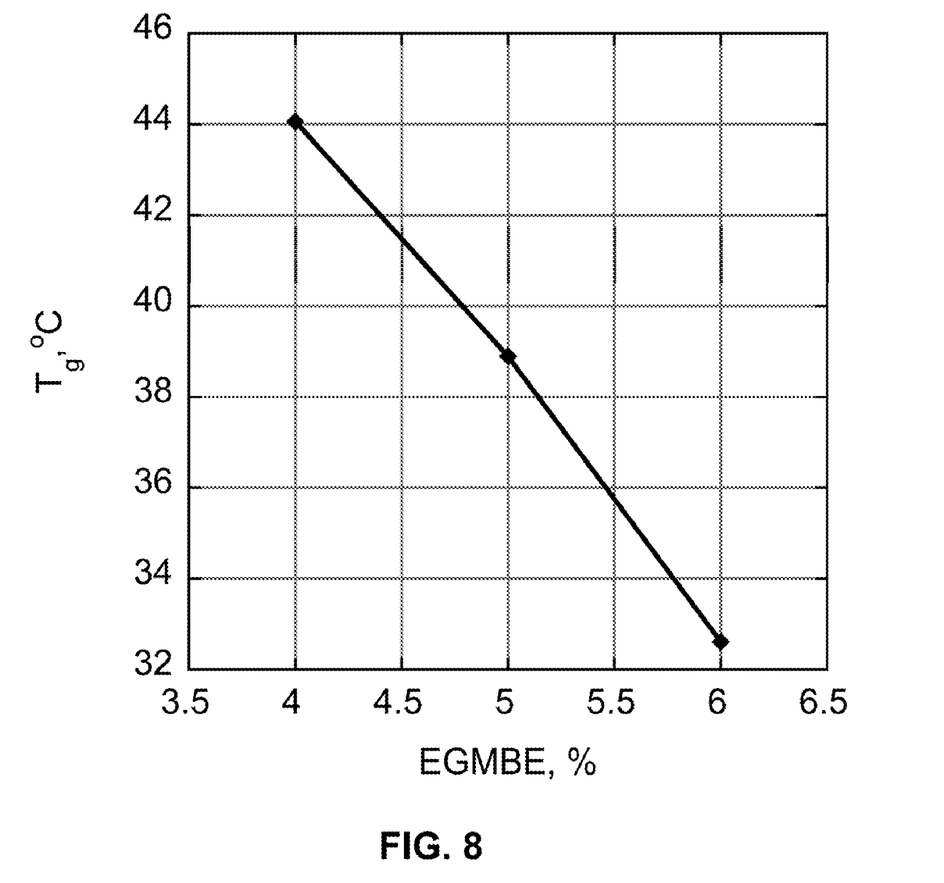
FIG. 8 is a graph of $T_g$ as a function of % ethylene glycol monobutyl ether (EGMBE) in an alcohol-based deployment fluid illustrating that the $T_g$ of the polymeric shape-memory material decreases as the EGMBE content in the deployment fluid increases.

The results of Table I are plotted in FIG. 8. It may be seen that the T$_g$ of the material decreases as the EGMBE content in the activation fluid increases.

Figure 9:
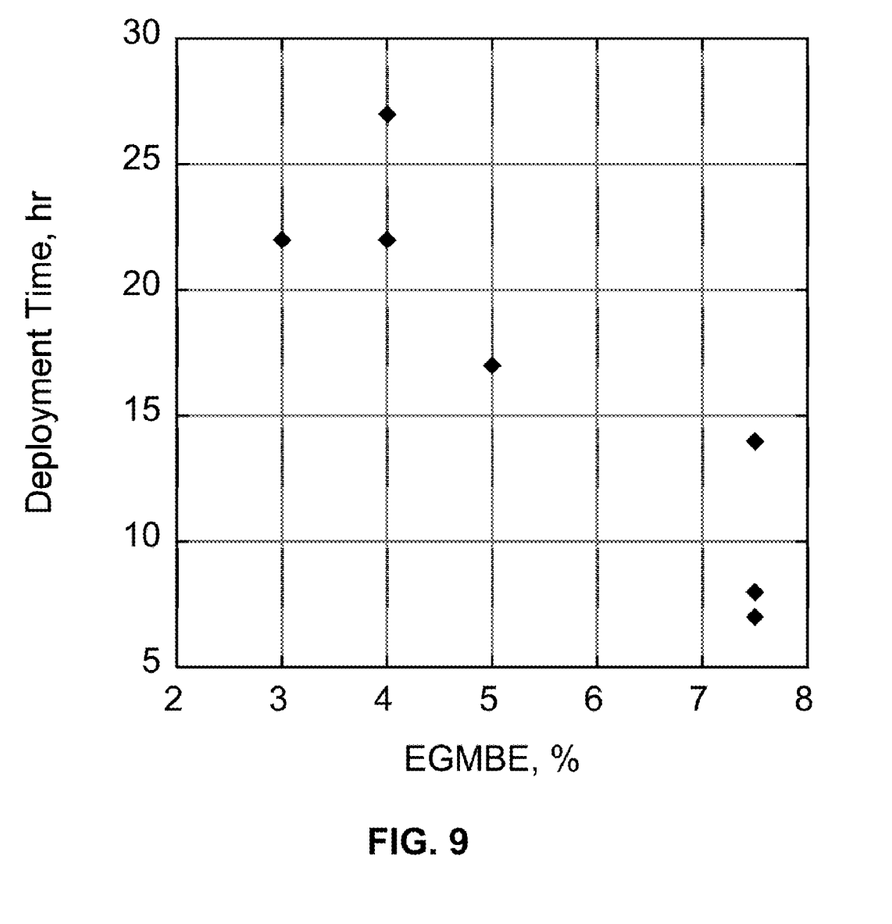
FIG. 9 is a chart illustrating that the higher the content of the EGMBE in an alcohol-based deployment fluid is, the less time it takes to deploy the polymeric shape-memory material to gauge hole diameter.

FIG. 9 shows that the higher the content of EGMBE in the deployment fluid, the less time it takes to deploy the TCS to gauge hole diameter. In the deployment experiments, the deployment fluids and corresponding deployment times were as shown in Table II. It thus may be seen that the deployment fluid which reduces T$_g$ more also reduces the deployment time more.

TABLE II

Deployment Times for Various Deployment Fluid Compositions

| Fluid Composition | Deployment Time, hr |
|---|---|
| 3% EGMBE 25% CH$_3$OH and 8.9 ppg KCl | 22 |
| 4% EGMBE 25% CH$_3$OH and 8.9 ppg KCl | 22 (1$^{st}$ test)<br>27 (2$^{nd}$ test) |
| 5% EGMBE 25% CH$_3$OH and 8.9 ppg KCl | 17 |
| 7.5% EGMBE 25% CH$_3$OH and 8.9 ppg KCl | 7 (1$^{st}$ test)<br>8 (2$^{nd}$ test)<br>14 (3$^{rd}$ test) |

It is to be understood that the invention is not limited to the exact details of construction, operation, exact materials, or embodiments shown and described, as modifications and equivalents will be apparent to one skilled in the art. Accordingly, the invention is therefore to be limited only by the scope of the appended claims. Further, the specification is to be regarded in an illustrative rather than a restrictive sense. For example, specific combinations of components to make the polymeric shape-memory materials, particular T$_g$s, particular deployment fluids used, specific downhole tool configurations, designs and other compositions, components and structures falling within the claimed parameters, but not specifically identified or tried in a particular method or apparatus, are anticipated to be within the scope of this invention.

The terms "comprises" and "comprising" in the claims should be interpreted to mean including, but not limited to, the recited elements. For instance, a wellbore device within the descriptions herein may consist of or consist essentially of at least one polymeric shape-memory material and a deployment fluid as defined by the claims. Similarly, a method of installing a wellbore device on a downhole tool in a wellbore may consist of or consist essentially of introducing the downhole tool bearing the wellbore device into a wellbore where the polymeric shape-memory material is contacted by a first fluid, substantially removing the first fluid, contacting the polymeric shape-memory material with a deployment fluid and recovering the polymeric shape-memory material from its altered geometric position for run-in to a recovered geometric position as further specified in the claims.

The present invention may suitably comprise, consist or consist essentially of the elements disclosed and may be practiced in the absence of an element not disclosed.

What is claimed is:

1. A wellbore device comprising:
   at least one polymeric shape-memory material having an original glass transition temperature (T$_g$) and an original rigidity; and
   a deployment fluid contacting the polymeric shape-memory material in an amount effective to have an effect upon the polymeric shape-memory material, the effect selected from the group consisting of lowering the T$_g$, decreasing the rigidity, and both, where the deployment fluid is selected from the group consisting of dimethyl sulfoxide, ketones, alcohols, glycols, ethers, and mixtures thereof;
   where the wellbore device has the property that when substantially all of the deployment fluid is removed from the polymeric shape-memory material, an effect is obtained selected from the group consisting of restoring the T$_g$ to within at least about 90% of the original T$_g$ restoring the rigidity within at least about 25% of the original rigidity, and both.

2. The wellbore device of claim 1 where the polymeric shape-memory material is selected from the group consisting of polyurethanes, polyurethanes made by reacting a polycarbonate polyol with a polyisocyanate, polyamides, polyureas, polyvinyl alcohols, vinyl alcohol-vinyl ester copolymers, phenolic polymers, polybenzimidazoles, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, and combinations thereof.

3. The wellbore device of claim 1 where the polymeric shape-memory material is a polyurethane formed by a process comprising reacting a polycarbonate polyol with an isocyanate.

4. The wellbore device of claim 1 where the wellbore device is selected from the group consisting of an expansion tool, a screen, a packer, an isolation plug and combinations thereof.

5. The wellbore device of claim 1 where the polymeric shape-memory material is in an altered geometric position different from an original geometric position.

6. A wellbore device comprising:
   a substrate;
   at least one polymeric shape-memory material on the substrate, the polymeric shape-memory material having an original glass transition temperature (T$_g$) and an original rigidity, where the polymeric shape-memory material is selected from the group consisting of polyurethanes, polyurethanes made by reacting a polycarbonate with a polyisocyanate, polyamides, polyureas, polyvinyl alcohols, vinyl alcohol-vinyl ester copolymers, phenolic polymers, polybenzimidazoles, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, and combinations thereof; and
   a deployment fluid contacting the polymeric shape-memory material in an amount effective to have an effect upon the polymeric shape-memory material, the effect selected from the group consisting of lowering the T$_g$ resulting in a second and lower T$_g$, decreasing the original rigidity resulting in a second, decreased rigidity, and both, where the deployment fluid is selected from the group consisting of dimethyl sulfoxide, ketones, alcohols, glycols, ethers, and mixtures thereof;

where the wellbore device has the property that when substantially all of the deployment fluid is removed from the polymeric shape-memory material, an effect is obtained selected from the group consisting of restoring the $T_g$ to within at least about 90% of the original $T_g$, restoring the rigidity within at least about 25% of the original rigidity, and both.

7. The wellbore device of claim 6 where the polymeric shape-memory material is a polyurethane formed by a process comprising reacting a polycarbonate polyol with an isocyanate.

8. The wellbore device of claim 6 where the wellbore device is selected from the group consisting of an expansion tool, a screen, a packer, an isolation plug and combinations thereof.

9. The wellbore device of claim 6 where the polymeric shape-memory material is in an altered geometric position different from an original geometric position.

10. A method of installing a wellbore device on a downhole tool in a wellbore, the method comprising:

introducing the downhole tool bearing the wellbore device into a wellbore, where the wellbore device comprises at least one polymeric shape-memory material having an original glass transition temperature ($T_g$) and an original rigidity, where the polymeric shape-memory material is in an altered geometric position and the polymeric shape-memory material is contacted by a first fluid;

substantially removing the first fluid;

contacting the polymeric shape-memory material with a deployment fluid in an amount effective to have an effect upon the polymeric shape-memory material, the effect selected from the group consisting of lowering the $T_g$, decreasing the rigidity, and both, where the deployment fluid is selected from the group consisting of dimethyl sulfoxide, ketones, alcohols, glycols, ethers, and mixtures thereof; and recovering the polymeric shape-memory material from its altered geometric position for run-in to a recovered geometric position;

where the wellbore device has the property that when substantially all of the deployment fluid is removed from the polymeric shape-memory material, an effect is obtained selected from the group consisting of restoring the $T_g$ to within at least about 90% of the original $T_g$ restoring the rididity within at least about 25% of the original rigidity, and both.

11. The method of claim 10 further comprising expanding the polymeric shape-memory material from its altered geometric position to a recovered geometric position.

12. The method of claim 10 where the polymeric shape-memory material is selected from the group consisting of polyurethanes, polyurethanes made by reacting a polycarbonate polyol with a polyisocyanate, polyamides, polyureas, polyvinyl alcohols, vinyl alcohol-vinyl ester copolymers, phenolic polymers, polybenzimidazoles, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, and combinations thereof.

13. The method of claim 10 where the polymeric shape-memory material is a polyurethane formed by a process comprising reacting a polycarbonate polyol with an isocyanate.

14. The method of claim 10 where the wellbore device is selected from the group consisting of an expansion tool, a screen, a packer, an isolation plug and combinations thereof.

15. A method of installing a wellbore device on a downhole tool in a wellbore, the method comprising:

introducing the downhole tool bearing the wellbore device into a wellbore, where the wellbore device comprises:

a substrate; and at least one polymeric shape-memory material on the substrate, the polymeric shape-memory material having an original glass transition temperature ($T_g$) and an original rigidity, where the polymeric shape-memory material is in an altered geometric position and the polymeric shape-memory material is contacted by a first fluid, where the polymeric shape-memory material is selected from the group consisting of polyurethanes, polyurethanes made by reacting a polycarbonate polyol with a polyisocyanate, polyamides, polyureas, polyvinyl alcohols, vinyl alcohol-vinyl ester copolymers, phenolic polymers, polybenzimidazoles, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, and combinations thereof;

substantially removing the first fluid;

contacting the polymeric shape-memory material with a deployment fluid in an amount effective to have an effect upon the polymeric shape-memory material, the effect selected from the group consisting of lowering the $T_g$ resulting in a second and lower $T_g$, decreasing the original rigidity resulting in a second, decreased rigidity, and both, where the deployment fluid is selected from the group consisting of dimethyl sulfoxide, ketones, alcohols, glycols, ethers, and mixtures thereof; and recovering the polymeric shape-memory material from its altered geometric position for run-in to a recovered geometric position, where the wellbore device has the property that when substantially all of the deployment fluid is removed from the polymeric shape-memory material, an effect is obtained selected from the group consisting of restoring the $T_g$ to within at least about 90% of the original $T_g$, restoring the rigidity within at least about 25% of the original rigidity, and both.

16. The method of claim 15 where the polymeric shape-memory material is a polyurethane formed by a process comprising reacting a polycarbonate polyol with an isocyanate.

17. The method of claim 15 where the wellbore device is selected from the group consisting of an expansion tool, a screen, a packer, an isolation plug and combinations thereof.

* * * * *